US012404715B2

(12) United States Patent
Barbulescu

(10) Patent No.: US 12,404,715 B2
(45) Date of Patent: Sep. 2, 2025

(54) COLLAPSIBLE ELEMENT FOR FAçADE SYSTEMS

(71) Applicant: ARCONIC TECHNOLOGIES LLC, Pittsburgh, PA (US)

(72) Inventor: Ion-Horatiu Barbulescu, Marietta, GA (US)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 210 days.

(21) Appl. No.: 18/183,300

(22) Filed: Mar. 14, 2023

(65) Prior Publication Data

US 2023/0323729 A1 Oct. 12, 2023

Related U.S. Application Data

(60) Provisional application No. 63/328,909, filed on Apr. 8, 2022.

(51) Int. Cl.
*E06B 3/263* (2006.01)
*E04B 2/96* (2006.01)

(52) U.S. Cl.
CPC ............ *E06B 3/2632* (2013.01); *E04B 2/967* (2013.01); *E06B 3/26303* (2013.01); *E06B 2003/26325* (2013.01); *E06B 2003/26398* (2013.01)

(58) Field of Classification Search
CPC ............... E06B 3/2632; E06B 3/26303; E06B 2003/26325; E06B 2003/26327; E06B 2003/26398; E04B 2/967
See application file for complete search history.

(56) References Cited

U.S. PATENT DOCUMENTS 5,309,689 A * 5/1994 Croissant ................ E04B 2/967 52/235
2021/0355679 A1* 11/2021 Newbrough .............. E04B 2/92

FOREIGN PATENT DOCUMENTS

DE 29608742 U1 * 8/1996 ............... E06B 1/36
DE 19707624 A1 * 8/1998 ............. E04B 2/967
DE 20003060 U1 * 4/2000 ........... E06B 3/2632
DE 10015838 A1 * 10/2001 ............. E04B 2/967
DE 102005032176 A1 * 1/2007 ......... E06B 3/26303
DE 202014100868 U1 * 7/2015 ........... E06B 3/2632
DE 202019106571 U1 * 4/2021 ............... E06B 3/22

(Continued)

OTHER PUBLICATIONS

Machine translation of EP2048315 (Year: 2024).*

*Primary Examiner* — Christine T Cajilig
(74) *Attorney, Agent, or Firm* — Vorys, Sater, Seymour and Pease LLP

(57) ABSTRACT

A façade system includes a mullion having exterior and interior portions and defining a glazing pocket between the exterior and interior portions, a thermal break arranged within the glazing pocket and extending between the exterior and interior portions, the thermal break dividing the glazing pocket into a shallow pocket and a deep pocket larger than the shallow pocket, and a collapsible element arranged within the deep pocket and extending between the thermal break and a lateral side of a panel introduced into the deep pocket. The collapsible element is movable between a collapsed state and an expanded state. The collapsible element divides the deep pocket into two or more thermal chambers when in the expanded state to reduce heat transfer by convection through the glazing pocket.

20 Claims, 11 Drawing Sheets

(56) References Cited

FOREIGN PATENT DOCUMENTS

| | | | | | |
|---|---|---|---|---|---|
| EP | 1174554 | A1 * | 1/2002 | ............. | E04B 2/967 |
| EP | 2048315 | A1 * | 4/2009 | ......... | E06B 3/26303 |
| EP | 2631407 | A2 * | 8/2013 | ............... | E06B 1/62 |
| FR | 2941003 | A3 * | 7/2010 | ......... | E06B 3/26347 |

* cited by examiner

COLLAPSIBLE ELEMENT FOR FAçADE SYSTEMS

BACKGROUND

Façade systems are commonly used in commercial buildings and generally comprise the structural elements that provide lateral and vertical resistance to wind and other actions, and further include the building envelope elements that provide weather resistance and thermal, acoustic, and fire resisting properties. Storefronts, window walls, and curtain walls are often used in the exterior of high-rise buildings. The overall energy efficiency of a building, including energy transfer characteristics of its façade system, is an important factor in architectural design, and there is a continued demand for building features and methods of construction that improve energy efficiency.

Some façade systems utilize frames made of metal, such as aluminum or aluminum alloy, and metal frames are particularly good thermal conductors. Thus, improved and/or alternative structures and methods for controlling the heat transfer characteristics of façade systems and for achieving aesthetic design objectives remain desirable.

SUMMARY OF THE DISCLOSURE

Embodiments disclosed herein include a façade system that includes a mullion having exterior and interior portions and defining a glazing pocket between the exterior and interior portions, a thermal break arranged within the glazing pocket and extending between the exterior and interior portions, the thermal break dividing the glazing pocket into a shallow pocket and a deep pocket larger than the shallow pocket, and a collapsible element arranged within the deep pocket and extending between the thermal break and a lateral side of a panel introduced into the deep pocket. The collapsible element is movable between a collapsed state and an expanded state, and wherein the collapsible element divides the deep pocket into two or more thermal chambers when in the expanded state to reduce heat transfer by convection through the glazing pocket. In a further embodiment of the façade system, the collapsible element is naturally biased to the expanded state. In another further embodiment of the façade system, the collapsible element is naturally biased to the collapsed state. In another further embodiment of the façade system, the collapsible element includes two side walls that fold inward upon moving to the collapsed state. In another further embodiment of the façade system, the collapsible element includes two side walls that fold outward upon moving to the collapsed state. In another further embodiment of the façade system, the collapsible element includes two side walls and an inner wall interposing the two side walls, and wherein the two side walls and the inner wall divide the deep pocket into the four thermal chambers. In another further embodiment of the façade system, the side walls fold outward and the inner wall folds toward one of the side walls upon moving to the collapsed state. In another further embodiment of the façade system, the collapsible element includes two side walls and a cross-member extending between the side walls, and wherein the size walls are folded over one another when in the collapsed state. In another further embodiment of the façade system, wherein at least one of the side walls extends between the thermal break and the lateral side of the panel upon transitioning to the expanded state. In another further embodiment of the façade system, the collapsible element comprises a first portion and a second portion separate from the first portion, each portion providing a side wall securable to the mullion and interconnected with a foldable inner wall, wherein the foldable inner wall is engageable with the lateral side upon transitioning to the expanded state. In another further embodiment of the façade system, the collapsible element includes first and second foldable inner walls that divide the deep pocket into three thermal chambers upon transitioning to the expanded state. In another further embodiment of the façade system, the collapsible element further includes opposing first and second side walls, and a cross-member extending between and interconnecting the opposing first and second side walls, wherein the foldable inner walls extend from corresponding transition points where the opposing first and second side walls meet the cross-member. In another further embodiment of the façade system, the collapsible element is secured to mullion or the panel with an attachment means selected from the group consisting of an adhesive, a coupling device, an interference fit, a snap-fit engagement, and any combination thereof. In another further embodiment of the façade system, the panel comprises a first panel and the system further comprises a second panel laterally offset from the first panel, wherein the glazing pocket is defined between the exterior and interior portions of the mullion and between lateral ends of the first and second panels, first and second exterior gaskets providing corresponding sealed interfaces between the first and second panels and the exterior portion of the mullion, and first and second interior gaskets providing corresponding sealed interfaces between the first and second panels and the interior portion of the mullion, wherein the first and second exterior and interior gaskets substantially seal the glazing pocket.

Embodiments disclosed herein may further include a method of reducing heat transfer through the façade system of the previous paragraph, the method may include the steps of dividing the deep pocket of the glazing pocket into the two or more thermal chambers with the collapsible element when the collapsible element is transitioned to the expanded state, and reducing heat transfer by convection through the glazing pocket with the collapsible element in the expanded state.

Embodiments disclosed herein may further include a method of assembling a façade system, the method may include coupling a first panel to a mullion, the mullion including an exterior portion and an interior portion, a glazing pocket defined between the exterior and interior portions, and a thermal break arranged within the glazing pocket and extending between the exterior and interior portions and thereby dividing the glazing pocket into a shallow pocket and a deep pocket larger than the shallow pocket, wherein the first panel is received within the shallow pocket. The method may further include advancing a second panel into the deep pocket and toward the thermal break, wherein a collapsible element is arranged in the deep pocket and movable between a collapsed state and an expanded state, and dividing the deep pocket into two or more thermal chambers with the collapsible element in the expanded state. The collapsible element is naturally biased to the expanded state and advancing the second panel into the deep pocket comprises collapsing the collapsible element to the collapsed state as the second panel advances into the deep pocket. The method may further include advancing the second panel into the second pocket at an angle offset from perpendicular to the thermal break. The method may further include drawing the second panel partially out of the deep pocket and thereby allowing the collapsible element to transition from the collapsed state to the expanded state. The collapsible element is secured to at least one of the thermal break and the lateral side of the panel with an attachment means selected from the group consisting of an adhesive, a coupling device, an interference fit, a snap-fit engagement, and any combination thereof.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to building products and, more particularly, to collapsible elements for reducing heat transfer by convection in façade systems.

Embodiments described herein disclose various designs and configurations of collapsible elements that may be arranged within glazing pockets of façade systems to help reduce convective heat transfer. The collapsible elements described herein divide the volume of air within the glazing pockets into multiple thermal chambers. This may prove advantageous in providing an inexpensive method of improving the thermal performance of façade systems. Moreover, the embodiments discussed herein may be adaptable to existing façade systems and otherwise consist in a universal method that can fit multiple façade systems.

Figure 1:
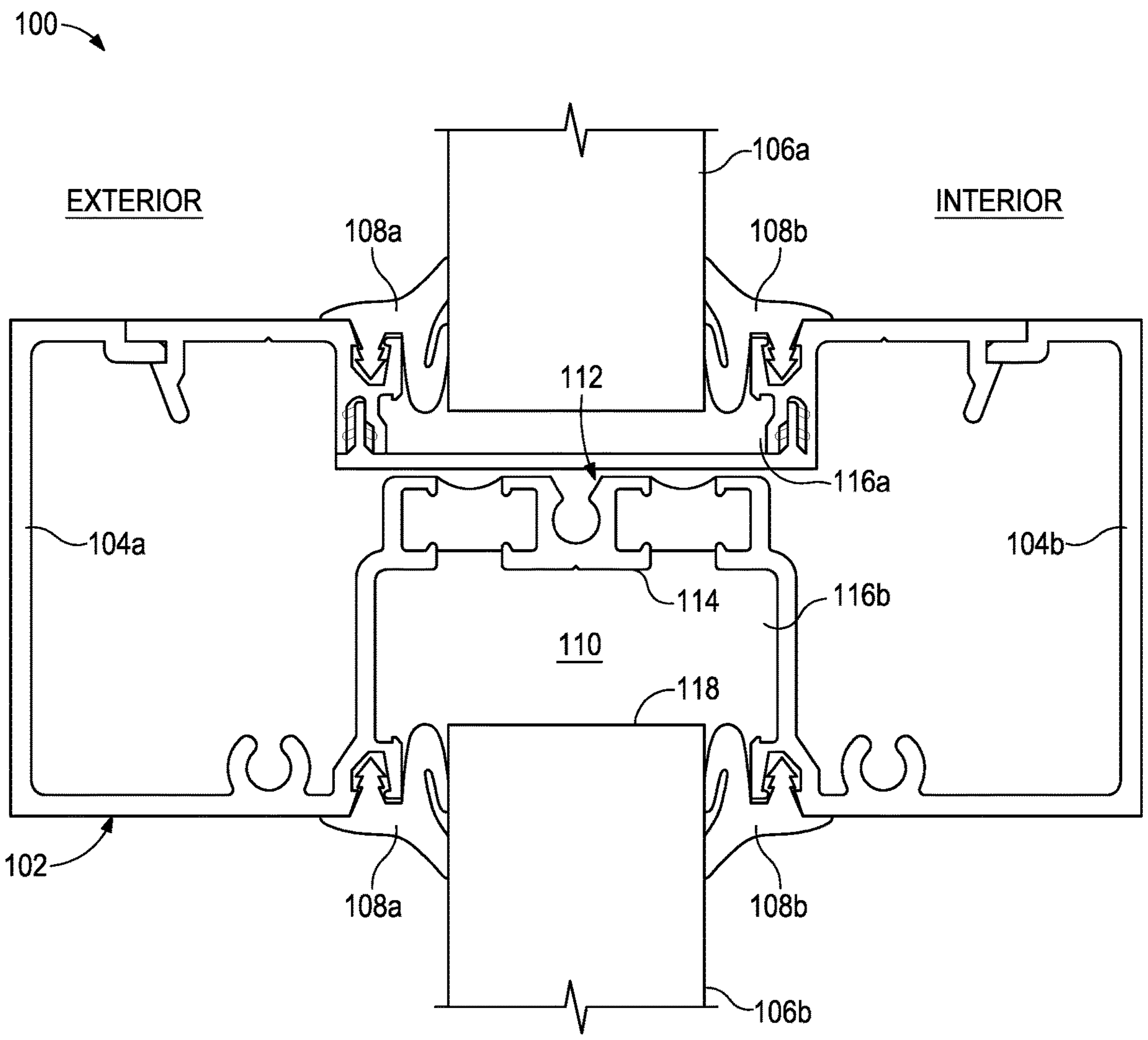
FIG. 1 (PRIOR ART)
FIG. 1 is schematic top view of a prior art façade system.

FIG. 1 is schematic top view of a prior art façade system 100. The façade system 100 (hereafter "the system 100") shown in FIG. 1 is an example storefront and could be applicable to large and small commercial buildings or residential buildings. The principles of the present disclosure, however, are also applicable to other types of façade systems, such as curtain wall systems, without departing from the scope of the disclosure.

As illustrated, the system 100 includes a vertical mullion 102 having a first or "exterior" portion 104*a* and a second or "interior" portion 104*b*. The exterior portion 104*a* is generally exposed to the exterior of a building, while the interior portion 104*b* is generally exposed to the interior of the building. The vertical mullion 102 may comprise a rigid extrusion made of aluminum, an aluminum alloy, or other material, including, but not limited to, other metals and alloys.

The vertical mullion 102 is designed to laterally support and/or secure one or more window panels, shown in FIG. 1 as a first panel 106*a* and a second panel 106*b* laterally offset from each other. The panels 106*a,b* may comprise glazing panels, but may alternatively comprise one or more panes of window glass, one or more panes of polycarbonate, or one or more panels of material that are clear, translucent, tinted, or opaque.

The panels 106*a,b* are secured to the mullion 102, at least in part, using one or more seals or gaskets, shown as exterior gaskets 108*a* and interior gaskets 108*b*. The exterior gaskets 108*a* provide a sealed interface between the panels 106*a,b* and the adjacent exterior portion 104*a* of the mullion 102, and the interior gaskets 108*b* provide a sealed interface between the panels 106*a,b* and the adjacent interior portion 104*b* of the mullion 102.

The mullion 102 extends from the exterior to the interior and defines a glazing pocket 110 configured and sized to receive and secure the panels 106*a,b*. To improve thermal performance of the system 100, the mullion 102 includes and otherwise provides a thermal break 112 that extends through the glazing pocket 110 and interconnects the exterior and interior portions 104*a,b*. The thermal break 112 may be made of one or more materials having a thermal conductivity that is less than a thermal conductivity of the vertical mullion 102.

The thermal break 112 may comprise any type of suitable thermal break capable of preventing conductive thermal energy loss between the exterior and interior portions 104*a, b*. In the illustrated example, the thermal break 112 comprises two interconnected pour and debridge (PND) thermal breaks consisting of a urethane material or the like. Moreover, the portions of the thermal break 112 are connected with a bridge 114, which may be made of aluminum, for example.

The thermal break 112 effectively divides the glazing pocket 110 into a first or "shallow" pocket 116*a* and a second or "deep" pocket 116*b*. As illustrated, the mullion 102 is configured such that the shallow pocket 116*a* exhibits a smaller size or volume as compared to the deep pocket 116*b*. Inclusion of the shallow and deep pockets 116*a,b* is designed to help in the assembly or installation process of the system 100.

More specifically, the system 100 is assembled by first receiving the first panel 106*a* into the shallow pocket 116*a* and thereby securing the first panel 106*a* to the mullion 102. The second panel 106*b* can then be advanced into the deep pocket 116*b* and situated perpendicular to the mullion 102. The depth of the deep pocket 116*b* allows the second panel 106*b* to be initially advanced into the deep pocket 116*b* toward the thermal break 112 at an angle offset from perpendicular to the mullion 102, which may be required due to tight manufacturing and construction tolerances and constraints. Once advanced into the deep pocket 116*b*, the orientation of the second panel 106*b* can then be adjusted to be perpendicular to the mullion 102, following which the second panel 106*b* may then be drawn or pulled away from the thermal break 112 a small distance while still remaining within the deep pocket 116*b*. In some installations, drawing the second panel 106*b* away from the thermal break 112 within the deep pocket 116*b* can simultaneously allow the installer to advance the opposing lateral side (not shown) of the second panel 106*b* into an adjacent shallow pocket (not shown) of an adjacent vertical mullion (not shown).

While the deep pocket 116*b* can serve an essential role during installation and assembly of the system 100, a large volume of air remains in the deep pocket 116*b* following installation. This can contribute to undesireable heat transfer by convection through the glazing pocket 110, and heat transfer by convection through the deep pocket 116*b* will negatively affect the thermal performance of the system 100.

According to embodiments of the present disclosure, the thermal performance of the system 100 may be improved by including or otherwise installing a collapsible element within the deep pocket 116*b* and generally arranged between the thermal break 112 and an adjacent lateral side 118 of the second panel 106*b*. The collapsible element may be designed to divide the deep pocket 116*b* into two or more thermal chambers, which correspondingly divides the volume of air within the deep pocket 116*b* and thereby operates to reduce heat transfer by convection through the glazing pocket 110.

Figure 2A:
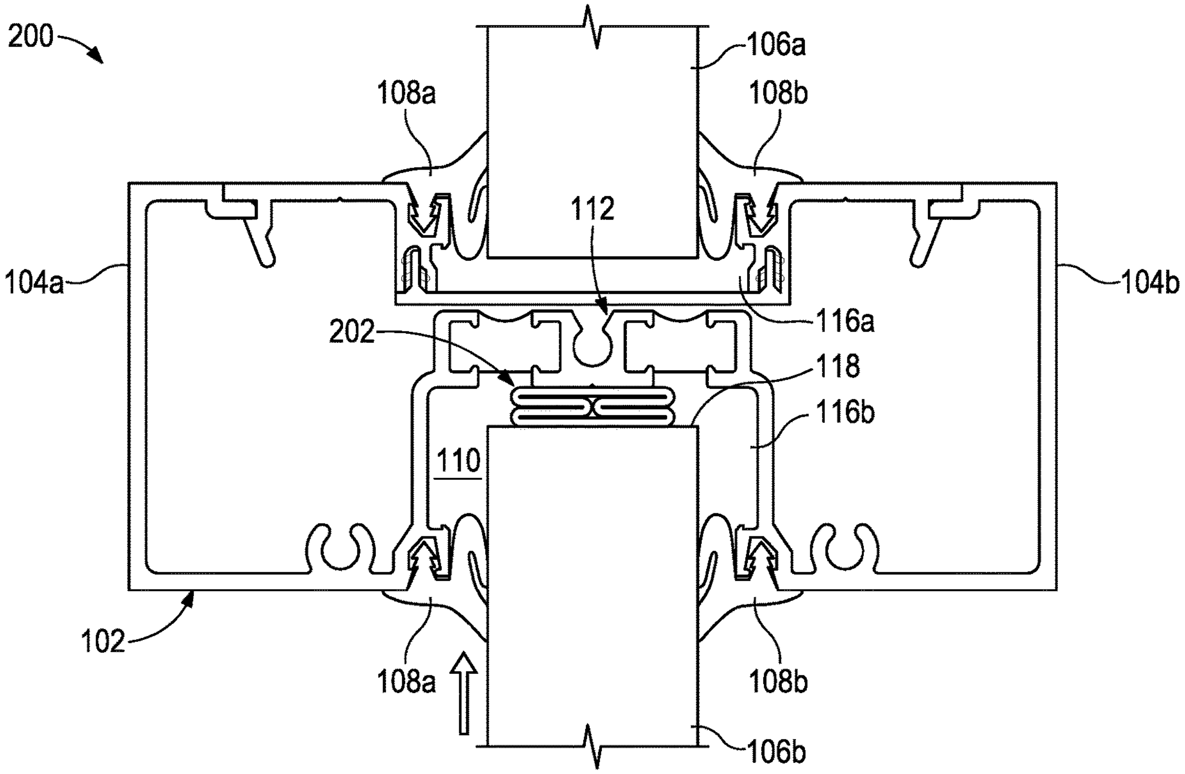
FIGS. 2A and 2B are schematic top views of an example façade system that incorporates the principles of the present disclosure.
Figure 2B:
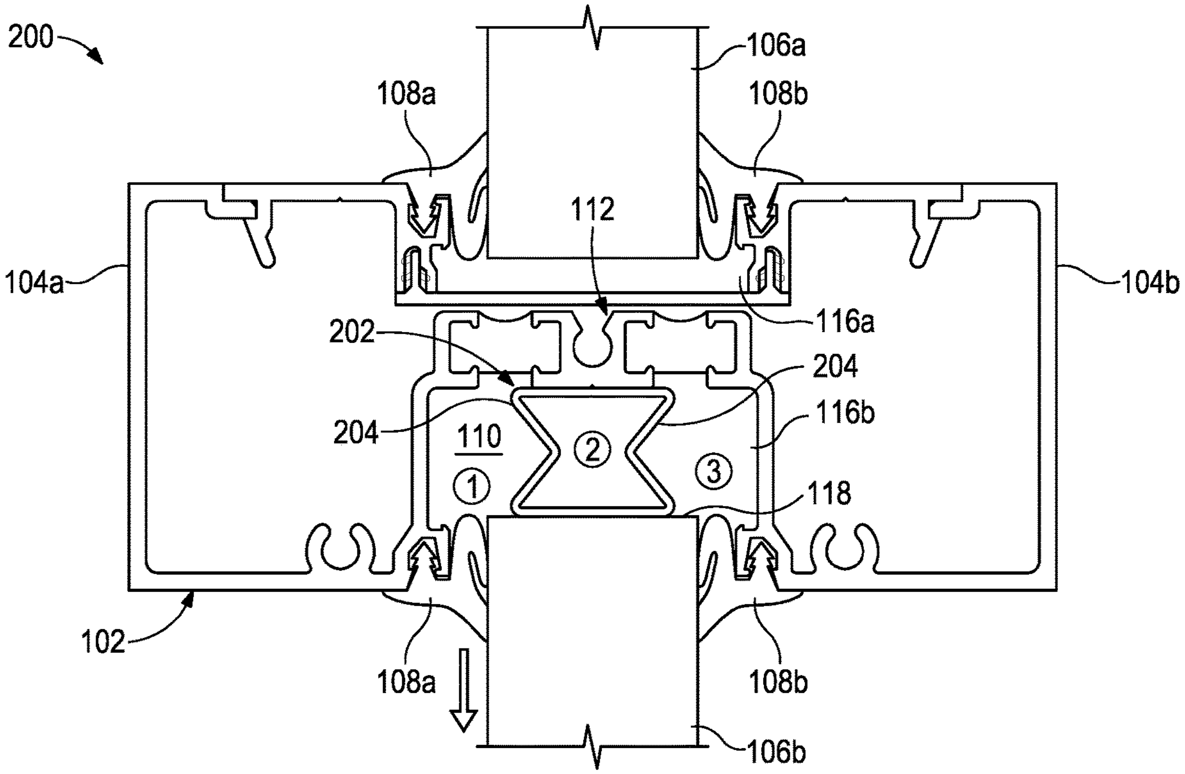

FIGS. 2A and 2B are schematic top views of an example façade system 200 that incorporates the principles of the present disclosure. The façade system 200 (hereafter "the system 200") may be similar in some respects to the system 100 of FIG. 1 and, therefore, may be best understood with reference thereto, where like numerals will represent like components not described again in detail. Similar to the system 100, the system 200 may form part of a storefront system, but is equally applicable to other types of façade systems, such as curtain wall systems.

As illustrated, the system 200 includes the vertical mullion 102 with the exterior and interior portions 104*a,b*, and the first and second panels 106*a,b* are secured to the mullion 102 using the exterior and interior gaskets 108*a,b*. Moreover, the mullion 102 includes the thermal break 112 arranged in the glazing pocket 110 and effectively dividing the glazing pocket 110 into the shallow and deep pockets 116*a,b*, as generally described above. It should be noted that while the mullion 102 is primarily described herein as a vertically-oriented member, embodiments are contemplated herein where the mullion 102 is installed as a horizontally-oriented member. In such embodiments, the principles of the present disclosure are equally applicable.

Unlike the system 100 of FIG. 1, however, the system 200 includes a collapsible element 202 arranged within the deep pocket 116*b*. In the illustrated embodiment, the collapsible element 202 extends between the mullion 102 and the adjacent lateral side 118 of the second panel 106*b*. More specifically, the collapsible element 202 extends between the lateral side 118 of the second panel 106*b* and the thermal break 112, which forms part of the mullion 102, as discussed above. In other embodiments, however, the collapsible element 202 could alternatively extend between other structural features of the deep pocket 116*b*, without departing from the scope of the disclosure.

The collapsible element 202 may be made of a variety of materials including, but not limited to ethylene propylene diene terpolymer (EPDM), EPDM foam, foam rubber, thermoplastic vulcanisate (TPV), similar polymers, or any combination thereof.

The collapsible element 202 is designed to be movable or collapsible between a collapsed state, as shown in FIG. 2A, and an expanded state, as shown in FIG. 2B. In some embodiments, the collapsible element 202 may be naturally biased to the expanded state, but could alternatively be naturally biased to the collapsed state. In some embodiments, the collapsible element 202 may be attached to and otherwise pre-assembled on the mullion 102 (e.g., attached to the thermal break 112). In other embodiments, however, the collapsible element 202 may be attached to and otherwise pre-assembled on (attached to) the lateral side 118 of the second panel 106*b*.

The collapsible element 202 is movable (transitionable) between the collapsed and expanded states during the assembly (installation) process of the second panel 106*b*. More particularly, in embodiments where the collapsible element 202 is naturally biased to the expanded state, advancing the second panel 106*b* into the deep pocket 116*b*, as generally described above, may cause the collapsible element 202 to collapse as the lateral side 118 of the second panel 106*b* approaches the thermal break 112. Upon subsequently drawing or pulling the second panel 106*b* away from the thermal break 112 a small distance, as also generally described above, the collapsible element 202 may be allowed to expand back to (or at least partially to) the expanded state.

In contrast, there may be embodiments where the collapsible element 202 is naturally biased to the collapsed state and pre-assembled (installed) on the thermal break 112 within the deep pocket 116*b*. In such embodiments, the second panel 106*b* may be advanced into the deep pocket 116*b* until engaging the lateral side 118 of the second panel 106*b* against the collapsible element 202 in the collapsed state. One or both of the lateral side 118 and the collapsible element 202 may have an adhesive or other coupling mechanism (e.g., Velcro) that attaches the collapsible element 202 to the lateral side 118 once the lateral side 118 contacts the collapsible element. Upon subsequently drawing (pulling) the second panel 106*b* away from the thermal break 112 a small distance within the deep pocket 116*b*, as generally described above, the collapsible element 202 may be pulled or urged to expand (at least partially) to the expanded state.

As shown in FIG. 2B, upon transitioning to the expanded state, the collapsible element 202 may divide the deep pocket 116*b* into two or more thermal chambers. In the illustrated embodiment, the expanded collapsible element 202 divides the deep pocket 116*b* into three thermal chambers, identified by the numbers "1", "2", and "3". The multiple thermal chambers 1, 2, 3 divide the volume of air within the deep pocket 116*b* into fractions equal to the number of thermal chambers, which operates to reduce heat transfer by convection through the glazing pocket 110.

In the illustrated embodiment, the collapsible element 202 exhibits a design similar in some respects to an accordion or bellows. More particularly, the collapsible element 202 includes two side walls 204 designed and otherwise configured to fold (bend) inward upon moving to the collapsed state. Those skilled in the art will readily appreciate, however, that the collapsible element 202 may exhibit several different designs and configurations that are equally capable of transiting between the collapsed and expanded states, and equally capable of dividing the deep pocket 116*b* into a plurality of thermal chambers, without departing from the scope of the disclosure.

It should be noted that the glazing pocket 110 where the collapsible element 202 is located is substantially sealed with the exterior and interior gaskets 108*a,b*. Consequently, the collapsible element 202 is not intended to operate as a type of gasket or otherwise perform a sealing function for the system 200. Rather, the main function of the collapsible element 202, as indicated above, is to reduce heat transfer by convection through the glazing pocket 110. This same principle is applicable to the other collapsible element embodiments described herein.

Figure 3A:
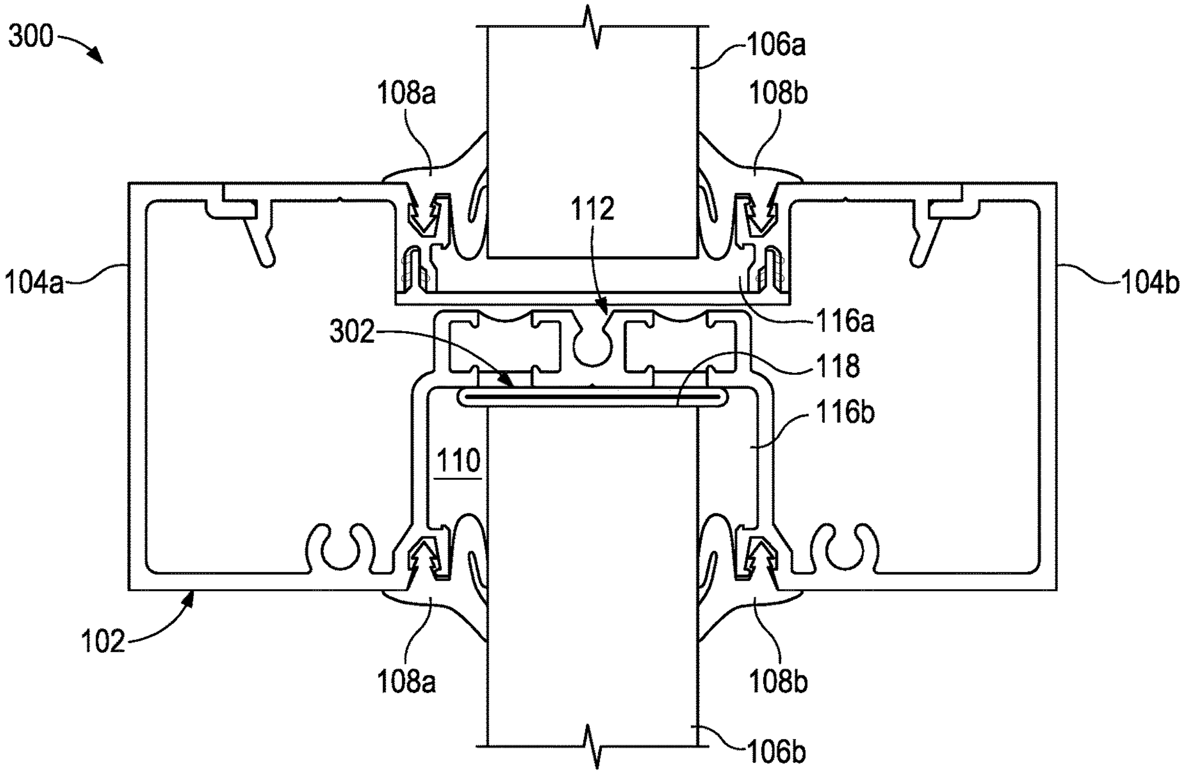
FIGS. 3A and 3B are schematic top views of another example façade system, in accordance with one or more additional embodiments of the present disclosure.
Figure 3B:
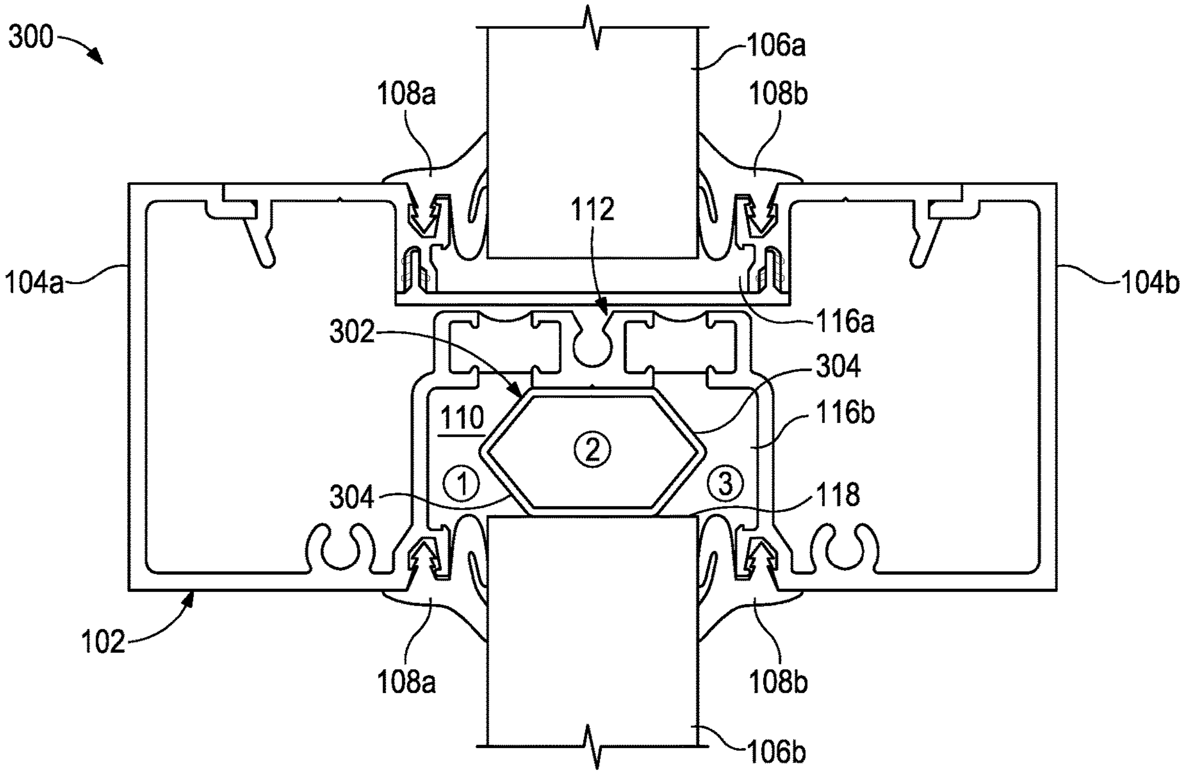

FIGS. 3A and 3B are schematic top views of another example façade system 300, in accordance with one or more additional embodiments of the present disclosure. The façade system 300 (hereafter "the system 300") may be similar in some respects to the system 200 of FIGS. 2A-2B and, therefore, may be best understood with reference thereto, where like numerals will represent like components not described again in detail. Similar to the system 200, the system 300 may form part of a storefront system, but the principles of the present disclosure are equally applicable to other types of façade systems, such as curtain wall systems.

As illustrated, the system 300 includes the mullion 102 with the exterior and interior portions 104*a,b*, and the first and second panels 106*a,b* secured to the mullion 102 using the exterior and interior gaskets 108*a,b*. Moreover, the mullion 102 includes the thermal break 112 arranged in the glazing pocket 110 and effectively dividing the glazing pocket 110 into the shallow and deep pockets 116*a,b*, as generally described above.

The system 300 also includes a collapsible element 302 arranged within the deep pocket 116*b* and extending between the mullion 102 (e.g., the thermal break 112) and the lateral side 118 of the second panel 106*b*. The collapsible element 302 may be similar in some respects to the collapsible element 202 of FIGS. 2A-2B, and therefore may be best understood with reference thereto.

The collapsible element 302 is movable or collapsible between a collapsed state, as shown in FIG. 3A, and an expanded state, as shown in FIG. 3B. In some embodiments, the collapsible element 302 may be naturally biased to the expanded state, but could alternatively be naturally biased to the collapsed state. In some embodiments, the collapsible element 302 may be attached to and otherwise pre-assembled on the mullion 102 (e.g., the thermal break 112). In other embodiments, however, the collapsible element 302 may be attached to and otherwise pre-assembled on the lateral side 118 of the second panel 106*b*.

The collapsible element 302 may be made of the same or similar materials as the collapsible element 202, and may operate similarly during the assembly (installation) process.

Upon transitioning to the expanded state, as shown in FIG. 3B, the collapsible element 302 is designed to divide the deep pocket 116*b* into three thermal chambers, identified by the numbers "1", "2", and "3", which effectively divide the volume of air within the deep pocket 116*b* into smaller volumes and thereby reduces heat transfer by convection through the glazing pocket 110. Similar to the collapsible element 202 of FIGS. 2A-2B, the collapsible element 302 exhibits a design similar in some respects to an accordion or a bellows. In the illustrated embodiment, however, the collapsible element 302 includes two side walls 304 designed to fold (bend) outward upon moving to the collapsed state.

Figure 4A:
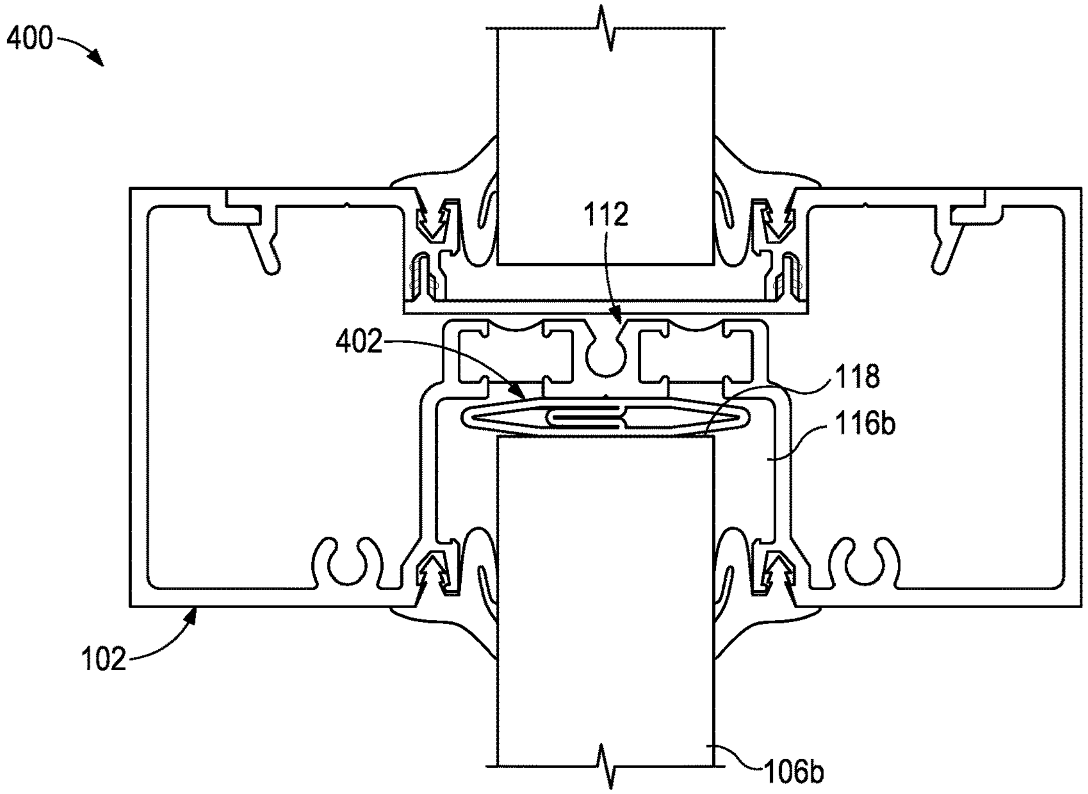
FIGS. 4A and 4B are schematic top views of another example façade system, in accordance with one or more additional embodiments of the present disclosure.
Figure 4B:
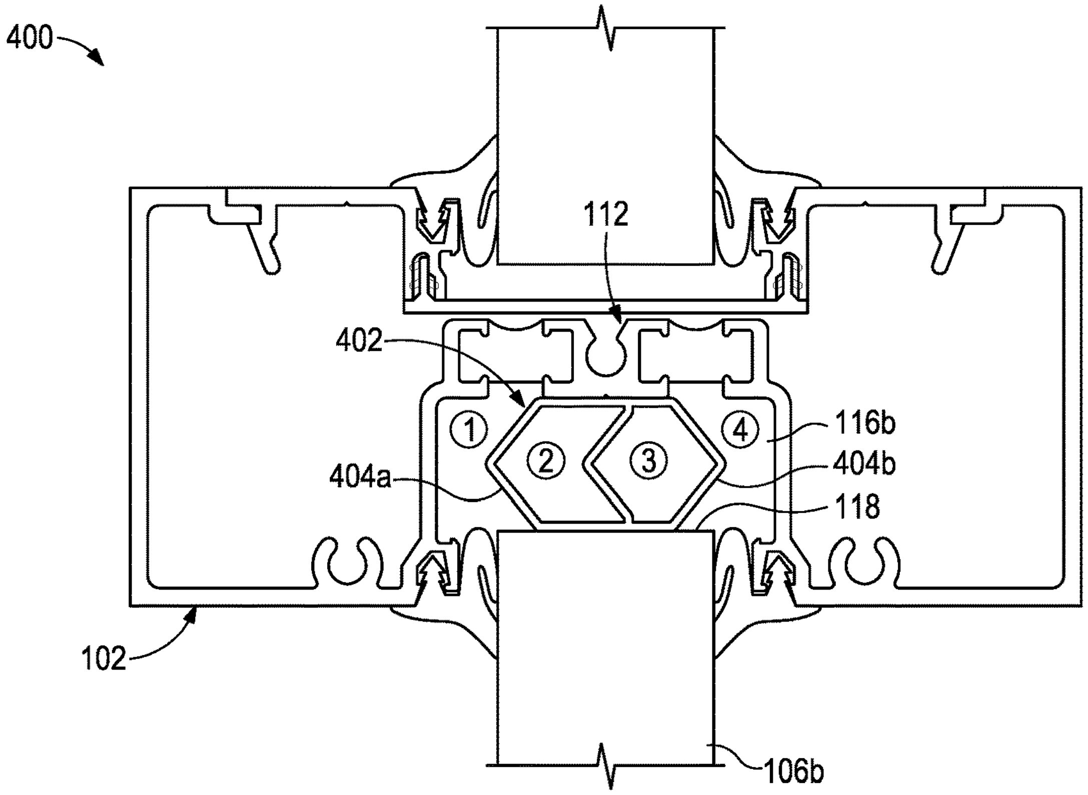

FIGS. 4A and 4B are schematic top views of another example façade system 400 in accordance with one or more additional embodiments of the present disclosure. The façade system 400 (hereafter "the system 400") may be similar in some respects to the façade systems 200 and 300 of FIGS. 2A-2B and 3A-3B and, therefore, may be best understood with reference thereto. Similar to the systems 200 and 300, the system 400 includes a collapsible element 402 arranged within the deep pocket 116*b* and extending between the mullion 102 (e.g., the thermal break 112) and the lateral side 118 of the second panel 106*b*.

The collapsible element 402 may be similar in some respects to the collapsible elements 202 and 302 of FIGS. 2A-2B and 3A-3B, and therefore may be best understood with reference thereto. The collapsible element 402 is movable (collapsible) between a collapsed state, as shown in FIG. 4A, and an expanded state, as shown in FIG. 4B. In some embodiments, the collapsible element 402 may be naturally biased to the expanded state, but could alternatively be naturally biased to the collapsed state. In some embodiments, the collapsible element 402 may be attached to and otherwise pre-assembled on the mullion 102 (e.g., the thermal break 112). In other embodiments, however, the collapsible element 402 may be attached to and otherwise pre-assembled on the lateral side 118 of the second panel 106*b*.

The collapsible element 402 may be made of the same or similar materials as the collapsible element 202, and may operate similarly during the assembly (installation) process.

Upon transitioning to the expanded state, as shown in FIG. 4B, the collapsible element 402 is designed to divide the deep pocket 116*b* into four thermal chambers, identified by the numbers "1", "2", "3", and "4", which effectively divide the volume of air within the deep pocket 116*b* into corresponding fractions that reduce heat transfer by convection through the glazing pocket 110.

Similar to the collapsible elements 202 and 302 of FIGS. 2A-2B and 3A-3B, the collapsible element 402 exhibits a design similar in some respects to an accordion or bellows. In contrast to the collapsible elements 202 and 302, however, the collapsible element 402 includes three walls that divide the deep pocket 116*b* into the four thermal chambers 1, 2, 3, 4. More specifically, the collapsible element 402 provides opposing side walls 404*a* and 404*b*, and an inner wall 406 interposing the side walls 404*a,b*. The side walls 404*a,b* are configured to exhibit an exterior fold (i.e., fold outward), while the inner wall 406 exhibits a fold directed either inward or outward and toward one side or the other upon moving to the collapsed state.

Figure 5A:
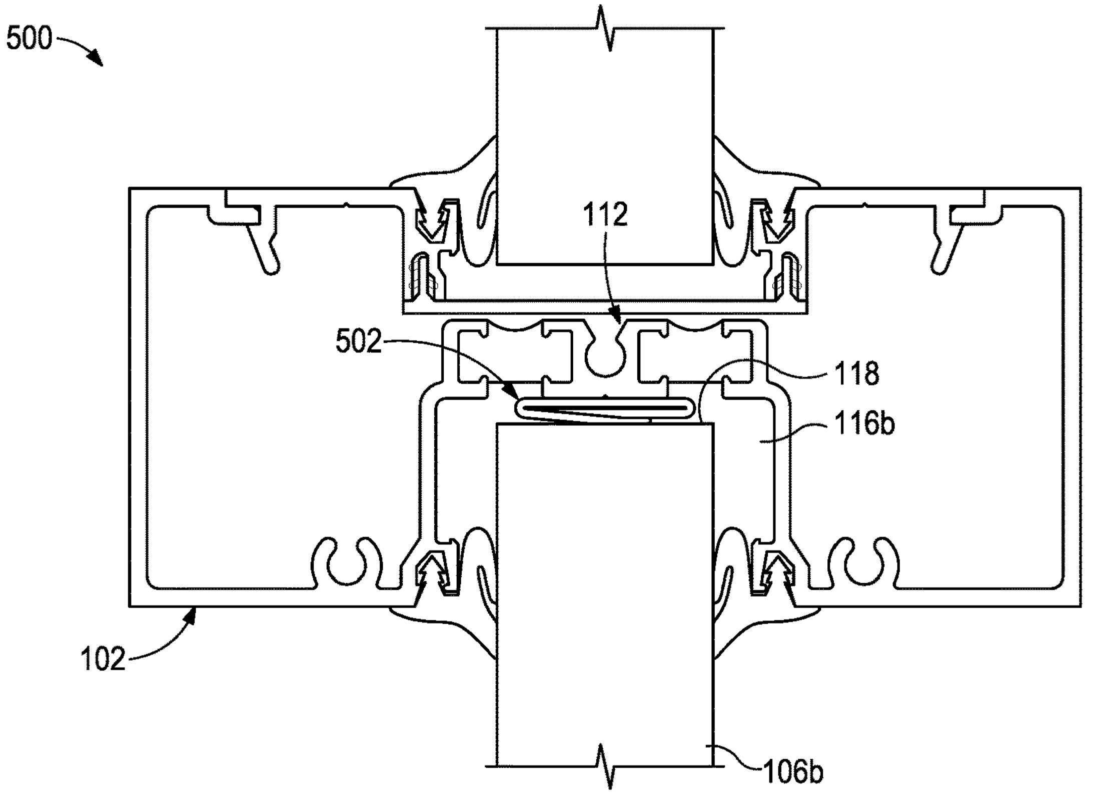
FIGS. 5A and 5B are schematic top views of another example façade system, in accordance with one or more additional embodiments of the present disclosure.
Figure 5B:
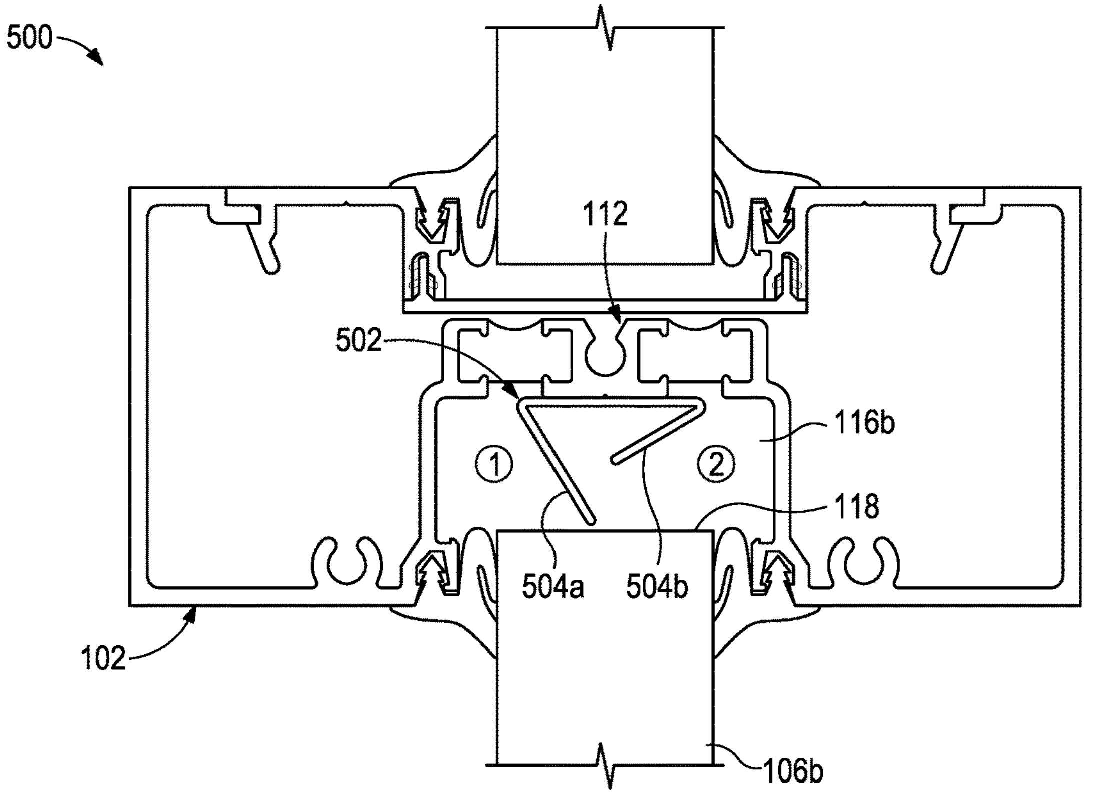

FIGS. 5A and 5B are schematic top views of another example façade system 500, in accordance with one or more additional embodiments of the present disclosure. The façade system 500 (hereafter "the system 500") may be similar in some respects to the façade systems 200, 300, and 400 described above and, therefore, may be best understood with reference thereto. Similar to the systems 200, 300, and 400, the system 500 includes a collapsible element 502 arranged within the deep pocket 116*b* and extending between the mullion 102 (e.g., the thermal break 112) and the lateral side 118 of the second panel 106*b*.

The collapsible element 502 may be similar in some respects to the collapsible elements 202, 302, and 402 described above, and therefore may be best understood with reference thereto. The collapsible element 502 is movable (collapsible) between a collapsed state, as shown in FIG. 5A, and an expanded state, as shown in FIG. 5B. In some embodiments, the collapsible element 502 may be naturally biased to the expanded state, but could alternatively be naturally biased to the collapsed state. In some embodiments, as illustrated, the collapsible element 502 may be attached to and otherwise pre-assembled on the mullion 102 (e.g., the thermal break 112). In other embodiments, however, the collapsible element 502 may be attached to and otherwise pre-assembled on the lateral side 118 of the second panel 106*b*.

The collapsible element 502 may be made of the same or similar materials as the collapsible element 202, and may operate similarly during the assembly (installation) process.

Upon transitioning to the expanded state, as shown in FIG. 5B, the collapsible element 502 is designed to divide the deep pocket 116*b* into two thermal chambers, identified by the numbers "1" and "2", which effectively divide the volume of air within the deep pocket 116*b* and thereby reduce heat transfer by convection through the glazing pocket 110. The collapsible element 502 includes two side walls 504*a* and 504*b* and a cross-member 506 extending between the two side walls 504*a,b*. When the collapsible element 502 is in the collapsed state, the side walls 504*a,b* may be folded over one another. Upon transitioning to the expanded state, however, at least one of the side walls 504*a,b* may extend to the lateral side 118 of the second panel 106*b*.

Figure 6A:
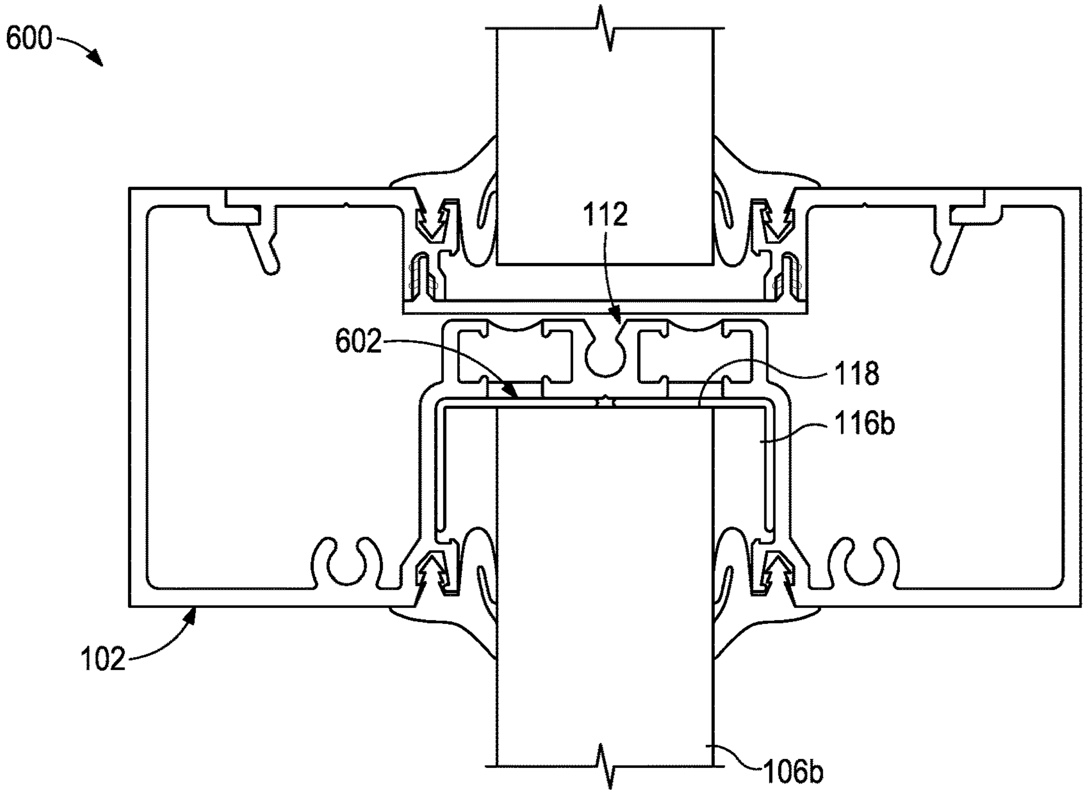
FIGS. 6A and 6B are schematic top views of another example façade system, in accordance with one or more additional embodiments of the present disclosure.
Figure 6B:
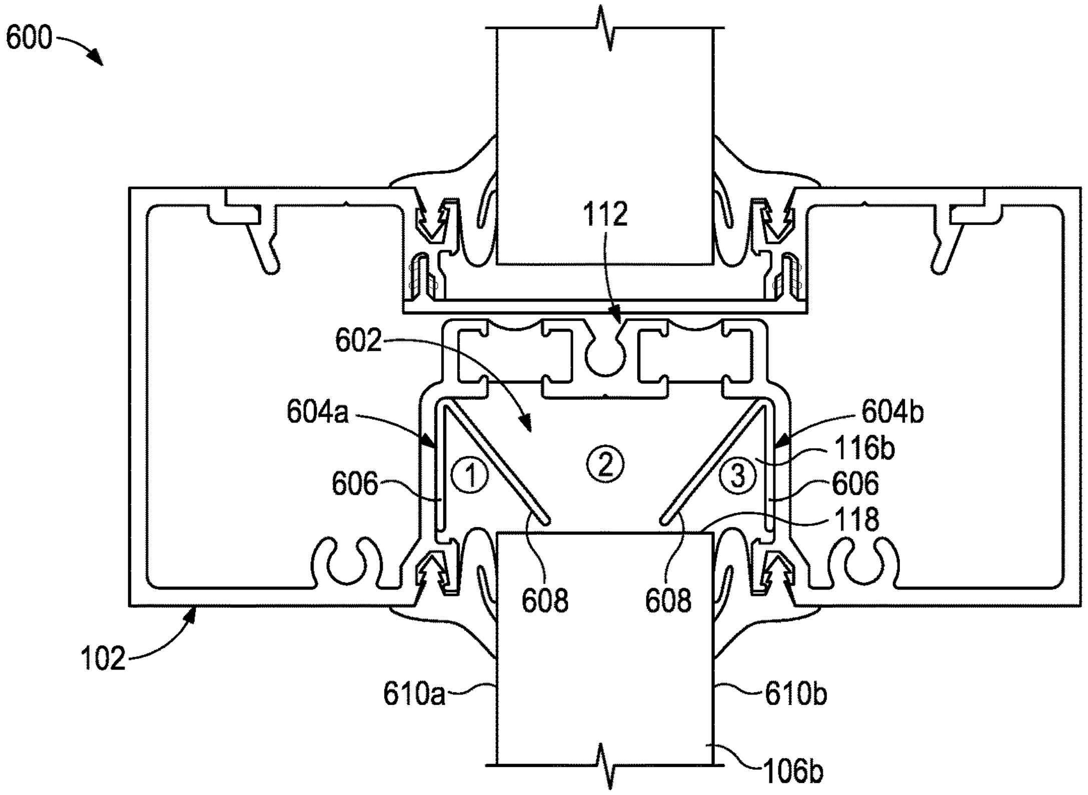

FIGS. 6A and 6B are schematic top views of another example façade system 600, in accordance with one or more additional embodiments of the present disclosure. The façade system 600 (hereafter "the system 600") may be similar in some respects to the façade systems 200, 300, 400, and 500 described above and, therefore, may be best understood with reference thereto. Similar to the systems 200, 300, 400, and 500, for example, the system 600 includes a collapsible element 602 arranged within the deep pocket 116*b* and extending between the mullion 102 and the second panel 106*b*.

The collapsible element 602 may be similar in some respects to the collapsible elements 202, 302, 402, and 502 described above, and therefore may be best understood with reference thereto. The collapsible element 602 is movable (collapsible) between a collapsed state, as shown in FIG. 6A, and an expanded state, as shown in FIG. 6B. In some embodiments, the collapsible element 602 may be naturally biased to the expanded state, but could alternatively be naturally biased to the collapsed state.

As illustrated, the collapsible element 602 may comprise multiple portions, shown as a first or "exterior" portion 604*a* and a second or "interior" portion 604*b* separate from the exterior portion 604*a*. The portions 604*a,b* may be attached to and otherwise pre-assembled on the mullion 102 prior to installation of the second panel 106*b*. More specifically, each portion 604*a,b* provides a side wall 606 interconnected with a foldable inner wall 608. The side walls 606 may be secured to adjacent inner portions of the mullion 102 and extend substantially parallel with the exterior and interior exposed surfaces 610*a* and 610*b* of the second panel 106*b*.

In contrast, the foldable inner walls 608 may extend from the corresponding side wall 606 at a living hinge and be able to flex or pivot between the collapsed and expanded states. When in the collapsed state, the inner walls 608 may interpose the thermal break 112 and the lateral side of the second panel 106*b*. Upon transitioning to the expanded state, however, the inner walls 608 may be configured to flex away from the thermal break 112. In some embodiments, the end of each inner wall 608 may engage the lateral side 118 of the second panel 106*b* when transitioned to the expanded state.

When transitioned to the expanded state, the collapsible element 602 may be configured to divide the deep pocket 116*b* into three thermal chambers, identified by numbers "1", "2", and "3", which divide the volume of air within the deep pocket 116*b* and thereby reduce heat transfer by convection through the glazing pocket 110.

Figure 7A:
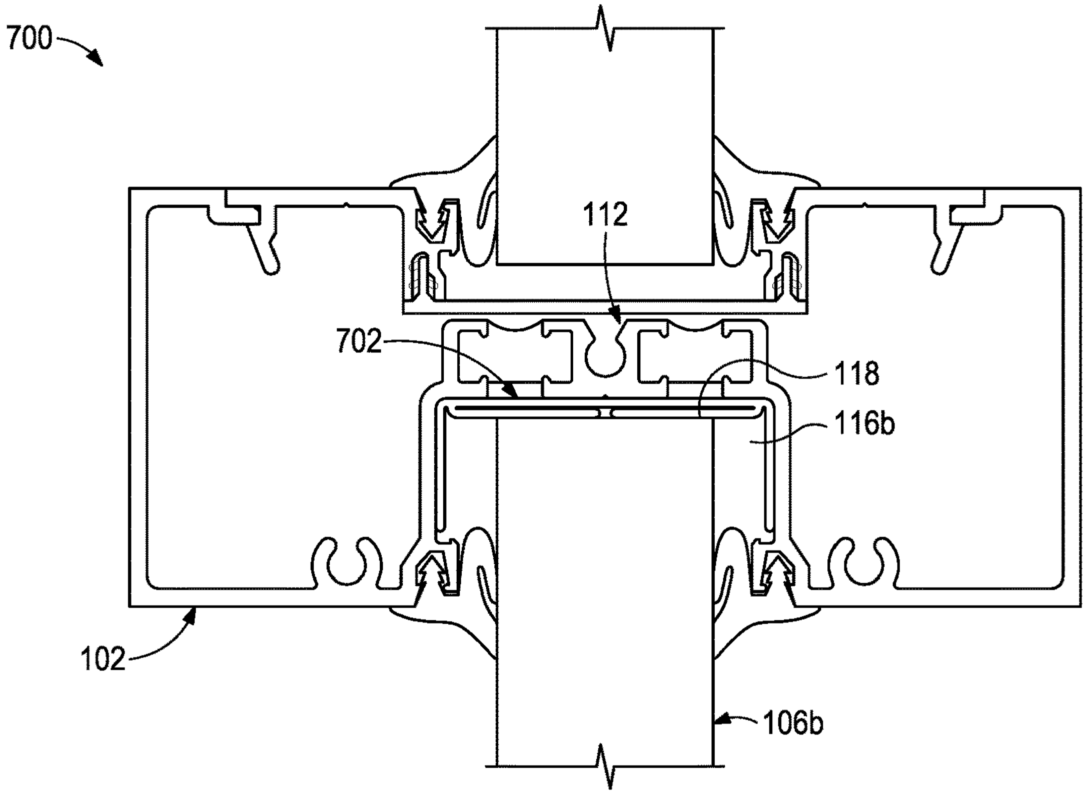
FIGS. 7A and 7B are schematic top views of another example façade system, in accordance with one or more additional embodiments of the present disclosure.
Figure 7B:
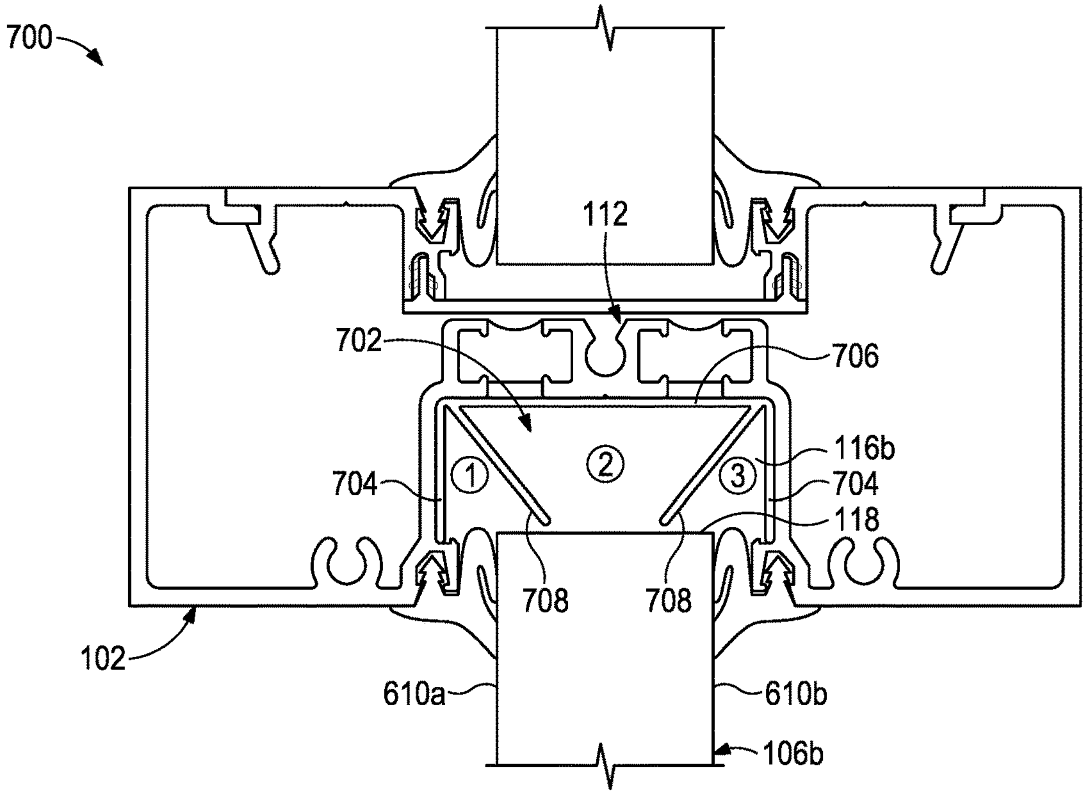

FIGS. 7A and 7B are schematic top views of another example façade system 700, in accordance with one or more additional embodiments of the present disclosure. The façade system 700 (hereafter "the system 700") may be similar in some respects to the façade systems 200, 300, 400, 500, and 600 described above and, therefore, may be best understood with reference thereto. Similar to the systems 200, 300, 400, 500, and 600, the system 700 includes a collapsible element 702 arranged within the deep pocket 116*b* and extending or extendible between the mullion 102 (e.g., the thermal break 112) and the lateral side 118 of the second panel 106*b*.

The collapsible element 702 may be similar in some respects to the collapsible elements 202, 302, 402, 502, and 602 described above, and therefore may be best understood with reference thereto. The collapsible element 702 is movable (collapsible) between a collapsed state, as shown in FIG. 7A, and an expanded state, as shown in FIG. 7B. In some embodiments, the collapsible element 702 may be naturally biased to the expanded state, but could alternatively be naturally biased to the collapsed state.

As best seen in FIG. 7B, the collapsible element 702 may include opposing side walls 704 secured to and otherwise arranged adjacent opposing inner portions of the mullion 102. The side walls 704 may extend substantially parallel with the exterior and interior exposed surfaces 610*a* and 610*b* of the second panel 106*b*. The collapsible element 702 may further include a cross-member 706 extending between and interconnecting the opposing side walls 704. As illustrated, the cross-member 706 may be secured to and otherwise arranged adjacent the thermal break 112.

The collapsible element 702 may further include one or more foldable inner walls 708 (two shown) that are able to transition between the collapsed and expanded states. More specifically, each inner wall 708 extends from a transition point where the sidewalls 704 meet the cross-member 706. When in the collapsed state, the inner walls 708 may interpose the cross-member 706 and the lateral side of the second panel 106*b*. Upon transitioning to the expanded state, however, the inner walls 708 may be configured to flex away from the cross-member 706. In some embodiments, the end of each inner wall 708 may engage the lateral side 118 of the second panel 106*b* when transitioned to the expanded state.

Upon transitioning to the expanded state, as shown in FIG. 7B, the collapsible element 702 is designed to divide the deep pocket 116*b* into three thermal chambers, identified by the numbers "1", "2", and "3", which divide the volume of air within the deep pocket 116*b* and thereby reduce heat transfer by convection through the glazing pocket 110.

As mentioned herein, the presently disclosed collapsible elements may be attached to and otherwise pre-assembled on the mullion 102 or alternatively on the lateral side 118 of the second panel 106*b*. FIGS. 8-11 depict example attachment means for securing collapsible elements within the corresponding systems.

Figure 8:
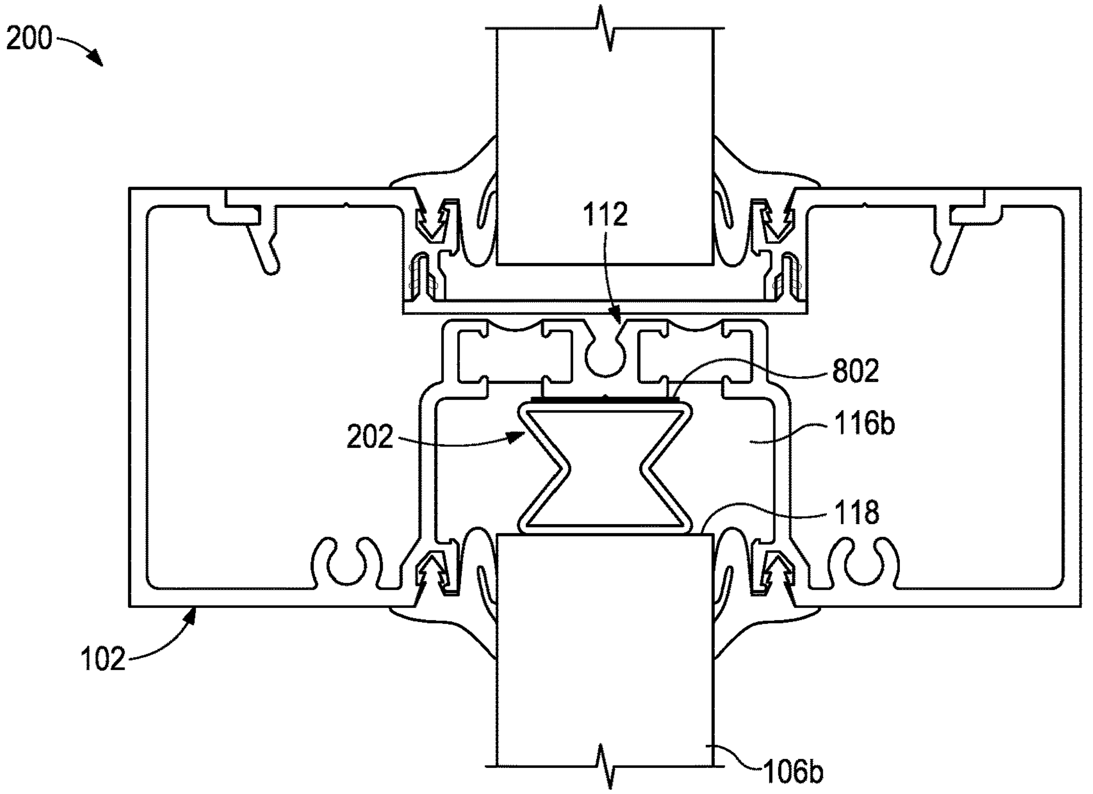
FIGS. 8-11 depict example attachment means for securing collapsible element within corresponding systems.

FIG. 8 shows the collapsible element 202 of FIGS. 2A-2B secured within the system 200 using an adhesive 802. In the illustrated embodiment, the adhesive 802 interposes the collapsible element 202 and a portion of the mullion 102, such as the thermal break 112. In such embodiments, the collapsible element 202 may be pre-installed within the deep pocket 116*b*. In other embodiments, however, the adhesive 802 may interpose the collapsible element 202 and the lateral side 118 of the second panel 106*b*. In such embodiments, the collapsible element 202 may be pre-installed on the second panel 106*b*. In yet other embodiments, the adhesive may be applied at both interfaces between the collapsible gasket 202 and the thermal break 112, and between the collapsible gasket 202 and the lateral side 118 of the second panel 106*b*. Upon drawing the second panel 106*b* partially out of the deep pocket 116*b*, as described herein, the collapsible element 202 may be urged to expand.

Figure 9:
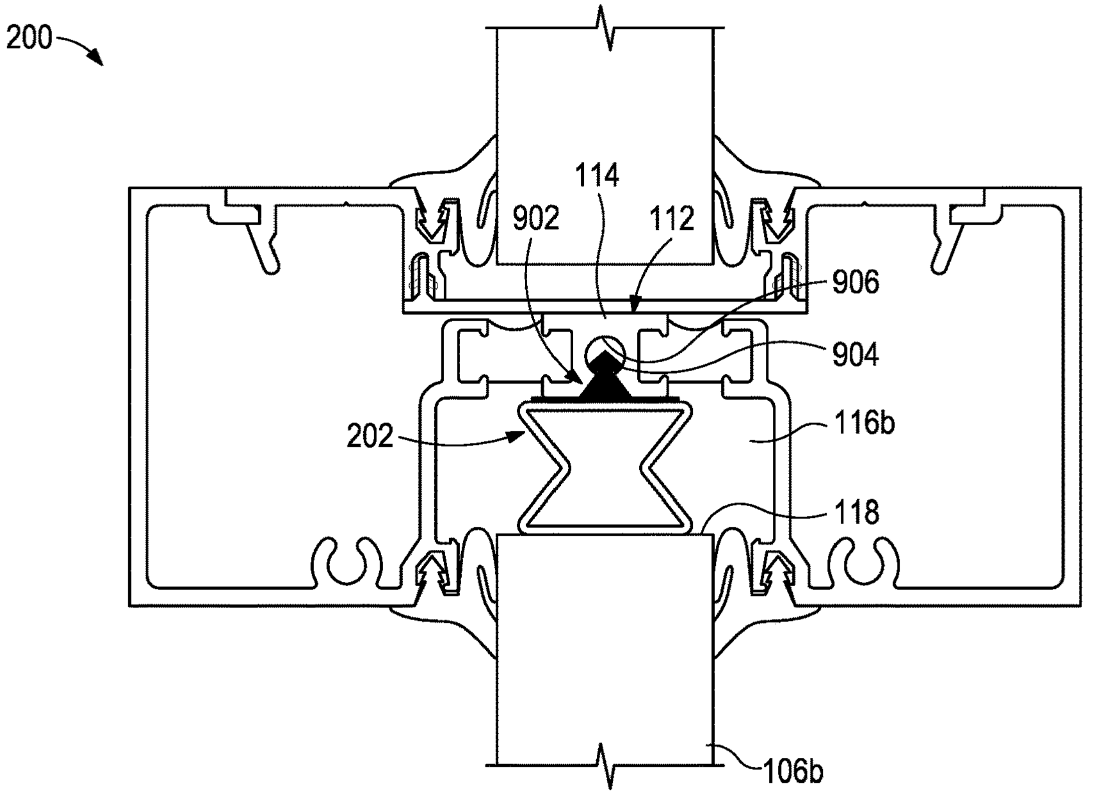

FIG. 9 shows the collapsible element 202 of FIGS. 2A-2B secured within the system 200 using a coupling device 902. In the illustrated embodiment, the coupling device 902 comprises a snap-fit or tongue-and-groove attachment coupled to the collapsible element 202 and capable of being secured to the bridge 114 forming part of the thermal break 112. More specifically, the coupling device 902 may provide or otherwise define a head 904 receivable within an aperture or channel 906 defined in the bridge 114.

In some embodiments, the collapsible element 202 may be pre-installed within the deep pocket 116*b* and attached to the bridge 114. In such embodiments, the head 904 may be received within the channel 906, and introducing the second panel 106*b* into the deep pocket 116*b* will compress the collapsible element 202, but drawing the second panel 106*b* partially out of the deep pocket 116*b* will allow the collapsible element 202 to expand. In other embodiments, however, the collapsible element 202 may be pre-installed on and otherwise secured to the lateral side 118 of the second panel 106*b*. In such embodiments, introducing the second panel 106*b* into the deep pocket 116*b* will allow the head 904 to locate and be received within the channel 906 as the collapsible element 202 is compressed. Once the coupling device 902 is secured to the bridge 114, drawing the second panel 106*b* partially out of the deep pocket 116*b* will allow the collapsible element 202 to expand.

Figure 10:
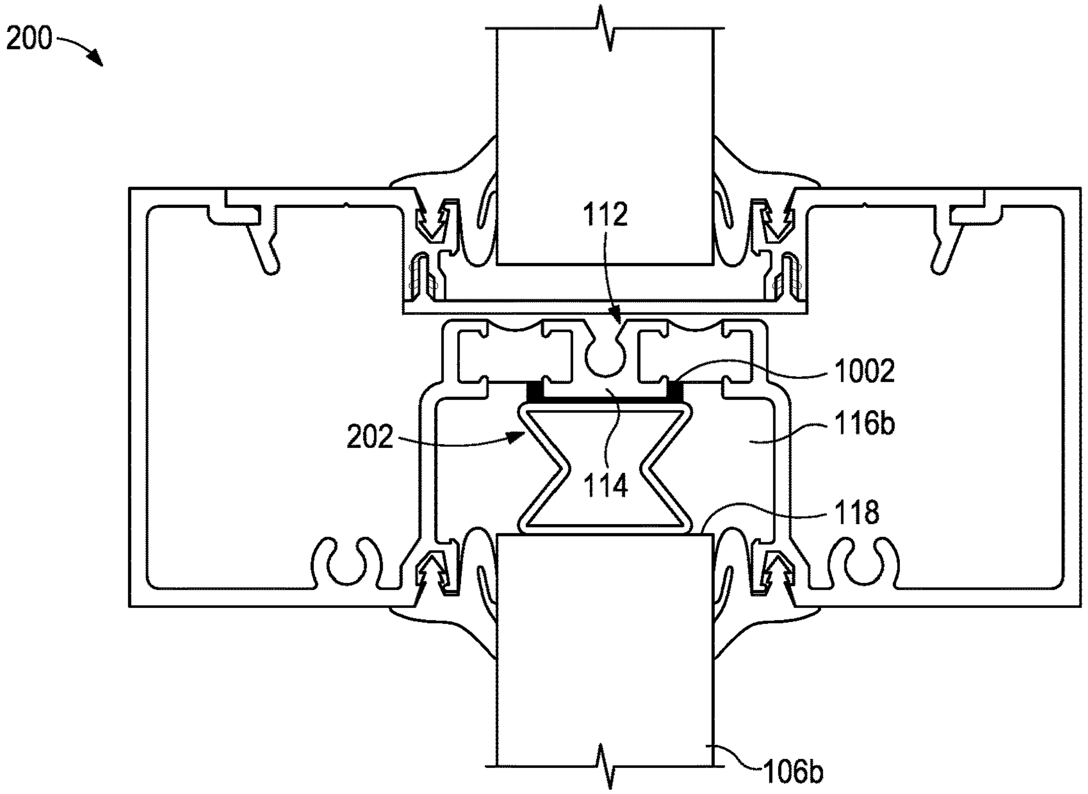

FIG. 10 shows the collapsible element 202 of FIGS. 2A-2B secured within the system 200 using an alternative type of coupling device 1002. In the illustrated embodiment, the coupling device 1002 comprises a snap-fit or interference-fit attachment configured to be secured to thermal break 112, such as the bridge 114.

In some embodiments, the collapsible element 202 may be pre-installed within the deep pocket 116*b* and attached to the thermal break 112 (e.g., the bridge 114) using the coupling device 1002. In other embodiments, however, the collapsible element 202 may be pre-installed on and otherwise secured to the lateral side 118 of the second panel 106*b*. In such embodiments, introducing the second panel 106*b* into the deep pocket 116*b* will allow the coupling device 1002 to engage and become secured to the thermal break 112 (e.g., the bridge 114) as the collapsible element 202 is compressed. Once the coupling device 1002 is secured to the thermal break 112, drawing the second panel 106*b* partially out of the deep pocket 116*b* will allow the collapsible element 202 to expand.

Figure 11:
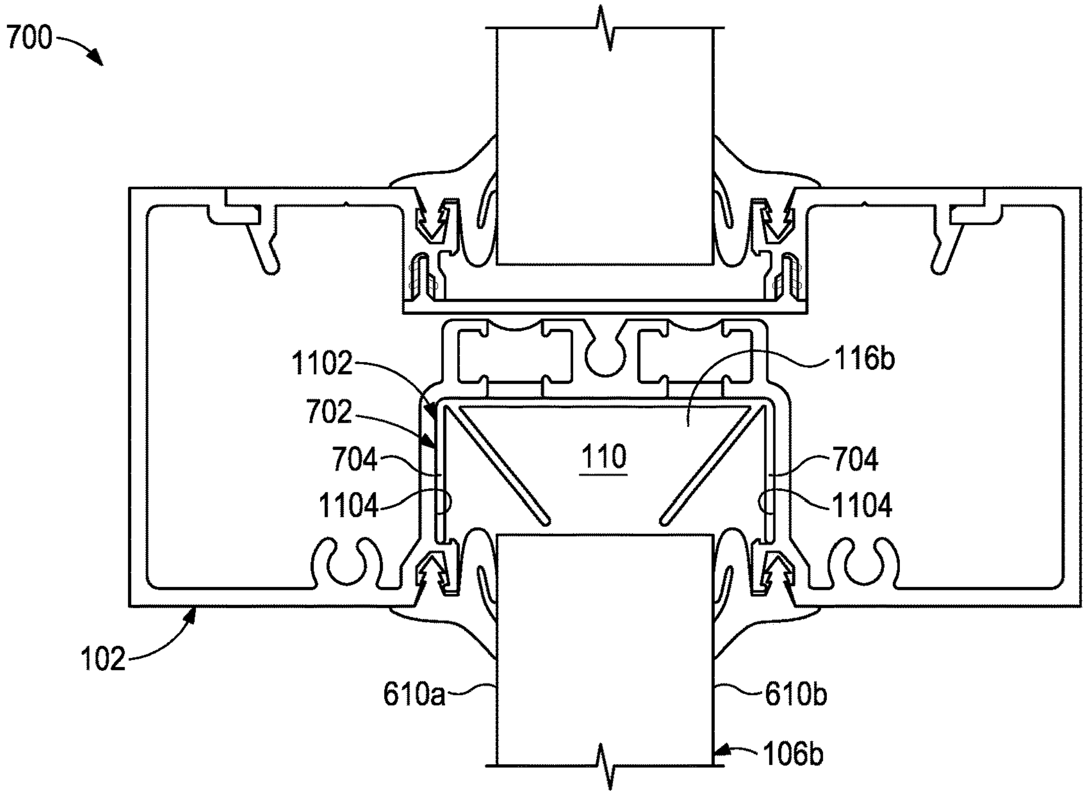

FIG. 11 shows the collapsible element 702 of FIGS. 7A-7B secured within the system 700. In the illustrated embodiment, the collapsible element 702 may include a coupling device 1102 configured to secure the collapsible element 702 to the mullion 102 via an interference fit or a snap-fit engagement. More specifically, the opposing side walls 704 of the collapsible element 702 may comprise the coupling device 1102, and may be sized and otherwise configured to form a snap-fit or interference-fit engagement with corresponding grooves 1104 defined by the mullion 102 within the glazing pocket 110 (e.g., the deep pocket 116*b*). Similar to the side walls 704, the grooves 1104 may extend substantially parallel with the exterior and interior exposed surfaces 610*a* and 610*b* of the second panel 106*b*. The collapsible element 702 may be pre-installed within the deep pocket 116*b*.

Figure 12:
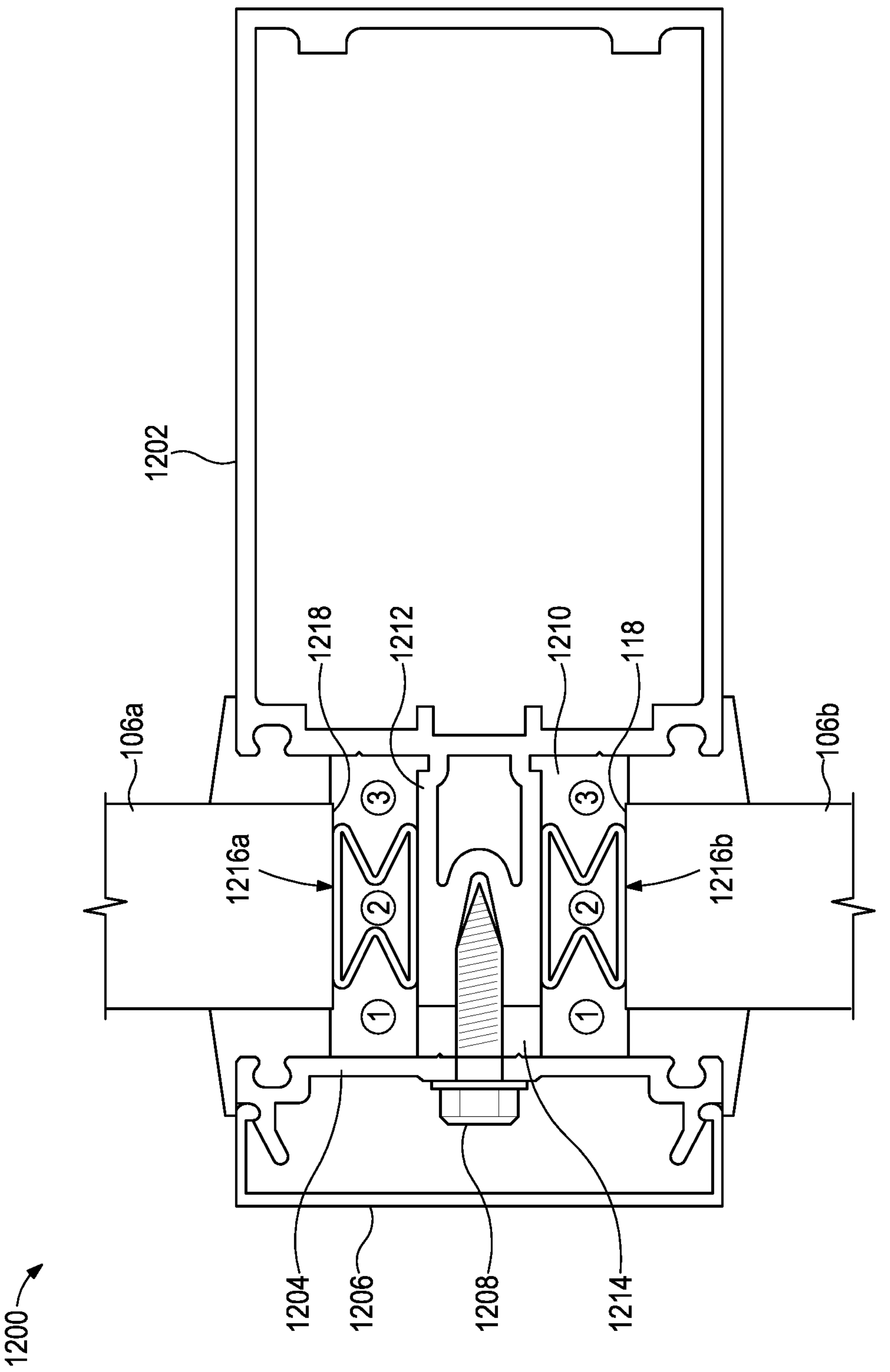
FIG. 12 is a cross-sectional view of a curtain wall system that may incorporate the principles of the present disclosure.

FIG. 12 is a top view of an example façade system 1200 that may incorporate the principles of the present disclosure. In the illustrated embodiment, the façade system 1200 (hereafter the "system 1200") comprises a curtain wall assembly configured to help laterally support and/or secure the first and second panels 106*a,b*. As illustrated, the system 1200 may include a vertical mullion 1202, which may comprise a rigid extrusion made of aluminum, an aluminum alloy, or other material, including, but not limited to, other metals and alloys. The vertical mullion 1202 may be coupled to a building structure, such as a beam that forms part of the building structure.

The system 1200 may further include a pressure plate 1204 and a cover 1206 removably coupled to the pressure plate 1204. The pressure plate 1204 may be operatively coupled to the vertical mullion 1202 with a fastener 1208, which may be a mechanical fastener, that extends through a glazing pocket 1210 defined laterally between the vertical mullion 1202 and the pressure plate 1204, and defined horizontally between the first and second glazing panels 106*a,b*. In the illustrated embodiment, the fastener 1208 comprises a screw that may be received within or otherwise threaded into a tongue 1212 extending from or forming part of the vertical mullion 1202. The system 1200 may further include a thermal separator 1214 positioned within the glazing pocket 1210 and interposing the pressure plate 1204 and the vertical mullion 1202 (e.g., the tongue 1212).

The system 1200 may further include one or more collapsible elements arranged within the glazing pocket 1210. In the illustrated embodiment, a first collapsible element 1216*a* is arranged in the glazing pocket 1210 and interposes the tongue 1212 and a lateral end 1218 of the first panel 106*a*. A second collapsible element 1216*b* is also arranged in the glazing pocket 1210, but interposes the tongue 1212 and the lateral end 118 of the second panel 106*b*. The collapsible elements 1216*a,b* are movable (collapsible) between collapsed and expanded states during installation of the system 1200. In some embodiments, the collapsible elements 1216*a,b* may be naturally biased to the expanded state, but could alternatively be naturally biased to the collapsed state. In some embodiments, the collapsible elements 1216*a,b* may be attached to and otherwise pre-assembled on the mullion 1202 (e.g., the tongue 1212), but could alternatively be attached to and otherwise pre-assembled on the lateral sides 1218, 118 of one or both of the panels 106*a,b*.

In the illustrated embodiment, the collapsible elements 1216*a,b* are the same as or similar to the collapsible element 202 of FIGS. 2A-2B. Accordingly, upon transitioning to the expanded state, as shown in FIG. 12, the collapsible elements 1216*a,b* may be designed to divide corresponding portions of the glazing pocket 1210 into three thermal chambers, identified by the numbers "1", "2", and "3". The multiple thermal chambers 1,2,3 divide the volume of air within the glazing pocket 1210, which operates to reduce heat transfer by convection through the glazing pocket 1210. In other embodiments, however, the collapsible elements 1216*a,b* may be replaced with any of the collapsible elements described herein, without departing from the scope of the disclosure.

Figure 13B:
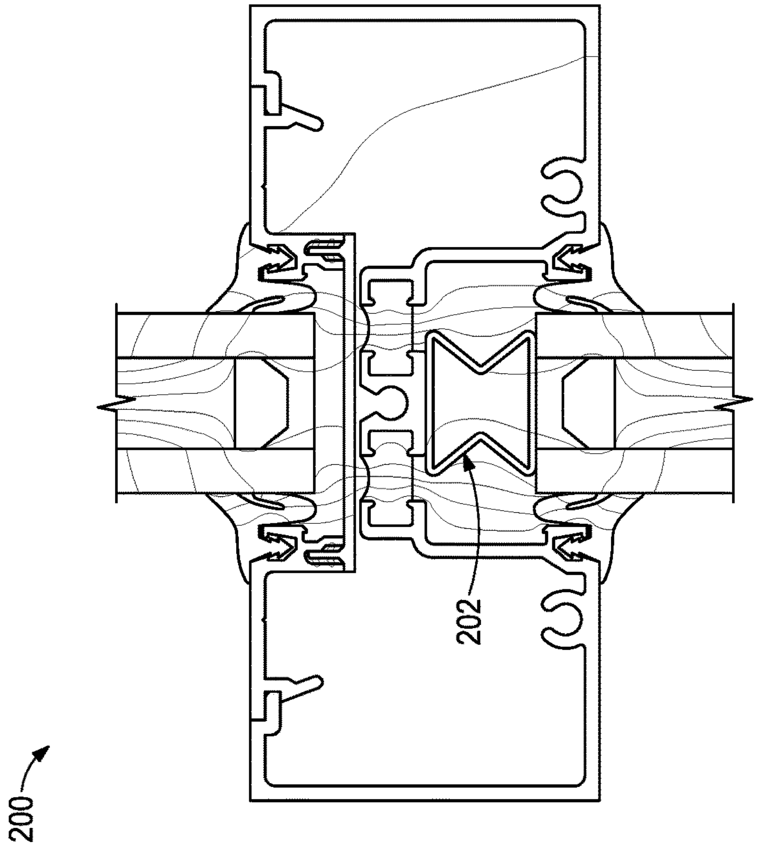
FIGS. 13A and 13B are side-by-side depictions of thermal simulations of the system of FIGS. 2A-2B.
Figure 13A:
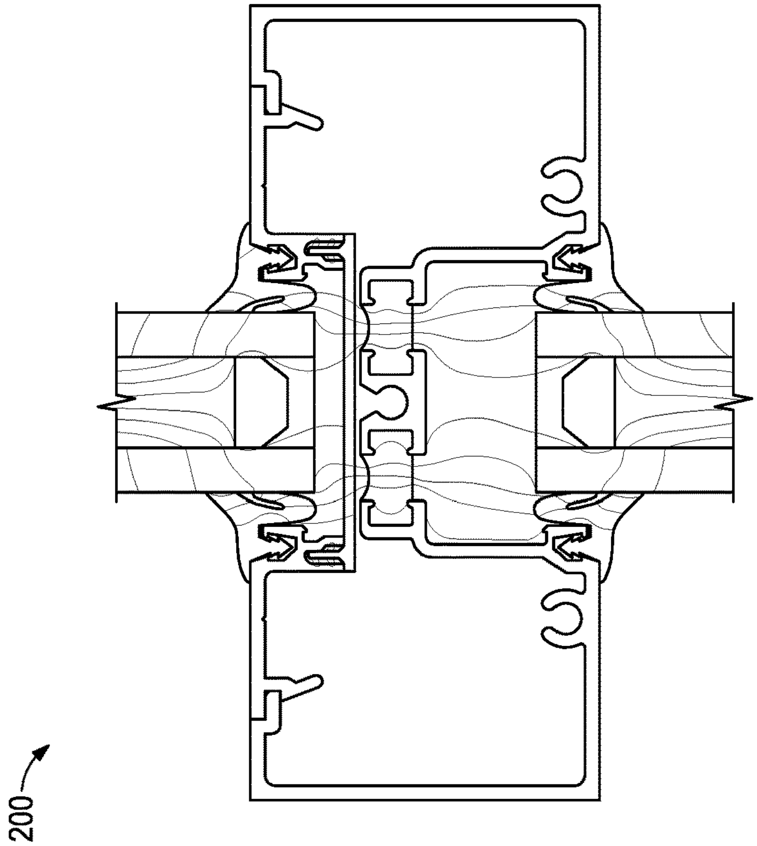

FIGS. 13A and 13B are side-by-side depictions of thermal simulations of the system 200 of FIGS. 2A-2B. More specifically, FIG. 13A depicts the system 200 without a collapsible element, and FIG. 13B depicts the system 200 including the collapsible element 202, as generally described above with reference to FIGS. 2A-2B. The thermal simulations were performed using commercially-available heat transfer software.

Table 1 below provides testing data comparing a conventional vertical mullion system without a collapsible element, to a vertical mullion system that includes a collapsible element, as generally described herein. It can be seen that the U-factor of the system provided with the thermal element is lower, therefore providing a better thermal performance and energy savings.

TABLE 1

| System | U-factor | U-factor | Improvement [%] |
| --- | --- | --- | --- |
| Conventional vertical mullion w/o collapsible element | 0.8795 Btu/h-ft$^2$-F | 4.9943 W/m$^2$-K | — |
| Vertical mullion w/ collapsible element | 0.8122 Btu/h-ft$^2$-F | 4.6121 W/m$^2$-K | 8.3% |

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Although various example embodiments have been disclosed, a worker of ordinary skill in this art would recognize that certain modifications would come within the scope of this disclosure. For that reason, the following claims should be studied to determine the scope and content of this disclosure.

What is claimed is:

1. A façade system, comprising:

a mullion having exterior and interior portions and defining a glazing pocket between the exterior and interior portions;

a thermal break arranged within the glazing pocket and extending between the exterior and interior portions, the thermal break dividing the glazing pocket into a shallow pocket and a deep pocket larger than the shallow pocket; and a collapsible element arranged within the deep pocket and extending between the thermal break and a lateral side of a panel introduced into the deep pocket, the collapsible element being movable between a collapsed state and an expanded state and including:

a first portion engageable with the thermal break;

a second portion opposite the first portion and engageable with the lateral side of the panel; and opposing first and second side walls extending between the first and second portions and being foldable as the collapsible element transitions between the expanded and collapsed states, and wherein an interior surface of the first and second side walls is engageable with the first and second portions, respectively, when the collapsible element is moved to the collapsed state and an expanded state, and wherein the collapsible element divides the deep pocket into three thermal chambers when in the expanded state to reduce heat transfer by convection through the glazing pocket.

2. The façade system of claim 1, wherein the collapsible element is naturally biased to the expanded state.

3. The façade system of claim 1, wherein the collapsible element is naturally biased to the collapsed state.

4. The façade system of claim 1, wherein the first and second side walls fold inward upon moving to the collapsed state.

5. The façade system of claim 1, wherein the first and second side walls fold outward upon moving to the collapsed state.

6. The façade system of claim 1, wherein the collapsible element further includes an inner wall interposing the two side walls, and wherein the two side walls and the inner wall divide the deep pocket into four thermal chambers.

7. The façade system of claim 6, wherein the two side walls fold outward and the inner wall folds toward one of the two side walls upon moving to the collapsed state.

8. The façade system of claim 1, wherein the collapsible element is secured to the mullion or the panel with an attachment means selected from the group consisting of an adhesive, a coupling device, an interference fit, a snap-fit engagement, and any combination thereof.

9. The façade system of claim 1, wherein the panel comprises a first panel and the system further comprises:

a second panel laterally offset from the first panel and received within the shallow pocket, wherein the glazing pocket is defined between the exterior and interior portions of the mullion and between lateral ends of the first and second panels;

first and second exterior gaskets providing corresponding sealed interfaces between the first and second panels and the exterior portion of the mullion; and first and second interior gaskets providing corresponding sealed interfaces between the first and second panels and the interior portion of the mullion, wherein the first and second exterior and interior gaskets substantially seal the glazing pocket.

10. A method of assembling a façade system, comprising:

coupling a first panel to a mullion, the mullion including:

an exterior portion and an interior portion;

a glazing pocket defined between the exterior and interior portions; and a thermal break arranged within the glazing pocket and extending between the exterior and interior portions and thereby dividing the glazing pocket into a shallow pocket and a deep pocket larger than the shallow pocket, wherein the first panel is received within the shallow pocket;

advancing a second panel into the deep pocket and toward the thermal break, wherein a collapsible element is arranged in the deep pocket and includes:

a first portion engageable with the thermal break;

a second portion opposite the first portion and engageable with a lateral side of the second panel; and opposing first and second side walls extending between the first and second portions and being foldable as the second panel advances into the deep pocket;

transitioning the collapsible element between a collapsed state and an expanded state as the second panel is received within the deep pocket, wherein an interior surface of the first and second side walls is engageable with the first and second portions, respectively, when the collapsible element is moved to the collapsed state; and dividing the deep pocket into three thermal chambers with the collapsible element in the expanded state.

11. The method of claim 10, wherein the collapsible element is naturally biased to the expanded state and advancing the second panel into the deep pocket comprises collapsing the collapsible element to the collapsed state as the second panel advances into the deep pocket.

12. The method of claim 11, further comprising advancing the second panel into the second pocket at an angle offset from perpendicular to the thermal break.

13. The method of claim 10, further comprising drawing the second panel partially out of the deep pocket and thereby allowing the collapsible element to transition from the collapsed state to the expanded state.

14. The method of claim 10, wherein the collapsible element is secured to at least one of the thermal break and the lateral side of the panel with an attachment means selected from the group consisting of an adhesive, a coupling device, an interference fit, a snap-fit engagement, and any combination thereof.

15. A method of reducing heat transfer through the façade system of claim 1, the method comprising:

dividing the deep pocket of the glazing pocket into the three thermal chambers with the collapsible element when the collapsible element is transitioned to the expanded state; and reducing heat transfer by convection through the glazing pocket with the collapsible element in the expanded state.

16. The façade system of claim 1, further comprising a coupling device securing the collapsible element to the thermal break, wherein the coupling device includes a head inserted into a bridge of the thermal break.

17. A façade system, comprising:

a mullion having exterior and interior portions and defining a glazing pocket between the exterior and interior portions;

a thermal break arranged within the glazing pocket and extending between the exterior and interior portions, the thermal break dividing the glazing pocket into a shallow pocket and a deep pocket larger than the shallow pocket; and a collapsible element arranged within the deep pocket and extending between the thermal break and a lateral side of a panel introduced into the deep pocket, the collapsible element being movable between a collapsed state and an expanded state and including:

a first portion engageable with the thermal break;

a second portion opposite the first portion engageable with the lateral side of the panel; and opposing first and second side walls extending between the first and second portions that fold outward as the collapsible element transitions from the expanded state to the collapsed state, wherein collapsible element divides the deep pocket into three or more thermal chambers when the collapsible element is in the expanded state to reduce heat transfer by convection through the glazing pocket.

18. The façade system of claim 17, wherein the first portion and second portion contact one another when the collapsible element is in the collapsed state.

19. The façade system of claim 17, wherein the collapsible element is naturally biased to the collapsed state.

20. The façade system of claim 17, the collapsible element further comprising an inner wall interposing the first and second side walls that folds toward one of the first and second side walls as the collapsible element moves from the expanded state to the collapsed state.

* * * * *